United States Patent
Munz et al.

[11] 3,785,116
[45] Jan. 15, 1974

[54] DEVICE FOR THE PRODUCTION OF FILLED AND CLOSED PLASTIC CONTAINERS

[75] Inventors: Paul Munz, Netstal; Hans Byland, Mitlodi, both of Switzerland

[73] Assignee: Maschinenfabrik und Giesserei Netstal AG, Nafels, Switzerland

[22] Filed: Aug. 31, 1971

[21] Appl. No.: 176,589

[52] U.S. Cl.............. 53/194, 53/140, 425/326 B, 425/242 B
[51] Int. Cl.............................................. B65b 1/02
[58] Field of Search.................... 53/140, 191, 194; 425/242 B, 324 B, 326 BJ, 302 B, 305 B, 326 B, 342, 387 B

[56] References Cited
UNITED STATES PATENTS

| | | | |
|---|---|---|---|
| 3,659,995 | 5/1972 | LaGrutta | 425/326 B X |
| 3,694,126 | 9/1972 | Pechthold | 425/387 B X |
| 3,632,267 | 1/1972 | Kader | 425/326 BJ |
| 3,251,915 | 5/1966 | Pechthold | 53/140 X |
| 3,196,593 | 7/1965 | Hey | 53/140 |

Primary Examiner—Travis S. McGehee
Assistant Examiner—John Sipos
Attorney—John J. McGlew

[57] ABSTRACT

In a method of producing, filling and closing plastic containers, the steps of producing a container preform, blowing up the preform and filling the resultant container, closing the filled container and removing the filled container are performed simultaneously at different locations or stations, whereby several containers are simultaneously subjected to respective different steps. Each container is produced, filled, closed and removed in two successive steps, the removal being effected at opposite ends of a row of stations, with the production of a preform being effected, in both steps, in the same station of the row by injection molding, while the blowing up and filling of a container, the closing of a filled container and the removal of the filled container are effected in successive steps at two different stations in the row and adjoining the injection molding station. The apparatus includes at least one row of five stations arranged at equal distances from each other, with first and fifth being removal stations, the second and the fourth being blowing up, filling and closing stations, and the third or central station being an injection molding station. A runner reciprocable longitudinally of the row in steps whose length is equal to the distance between adjacent stations is arranged above stationary lower tools provided in each of the five stations. This runner carries four upper tools on a support which is vertically reciprocable into and out of operative relation with the lower tools. The runner is reciprocated through a stroke equal to the distance between two adjacent stations. In each of the two positions of the runner, the four upper tools cooperate with a respective end station and the three stations immediately succeeding the end station.

6 Claims, 3 Drawing Figures

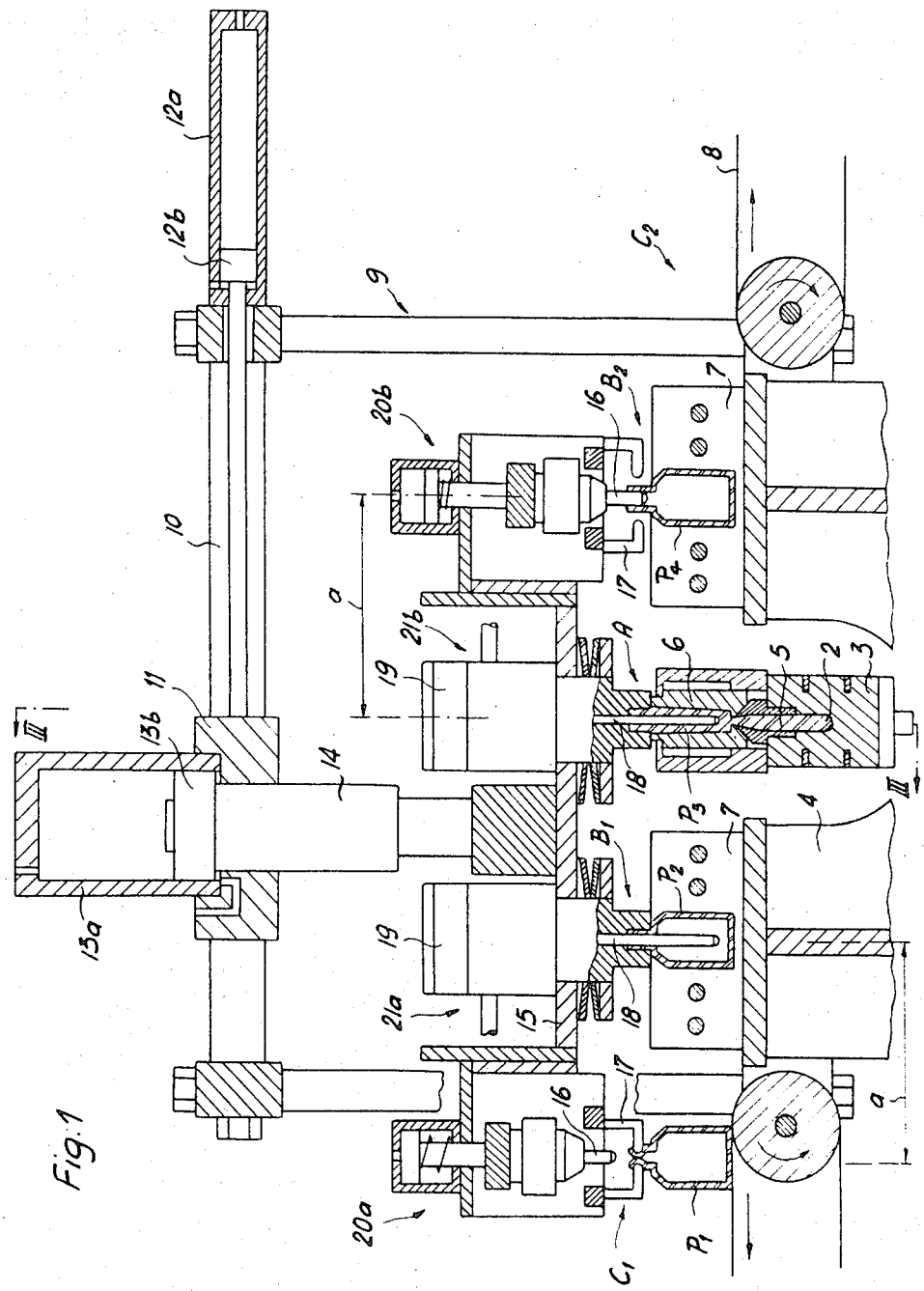

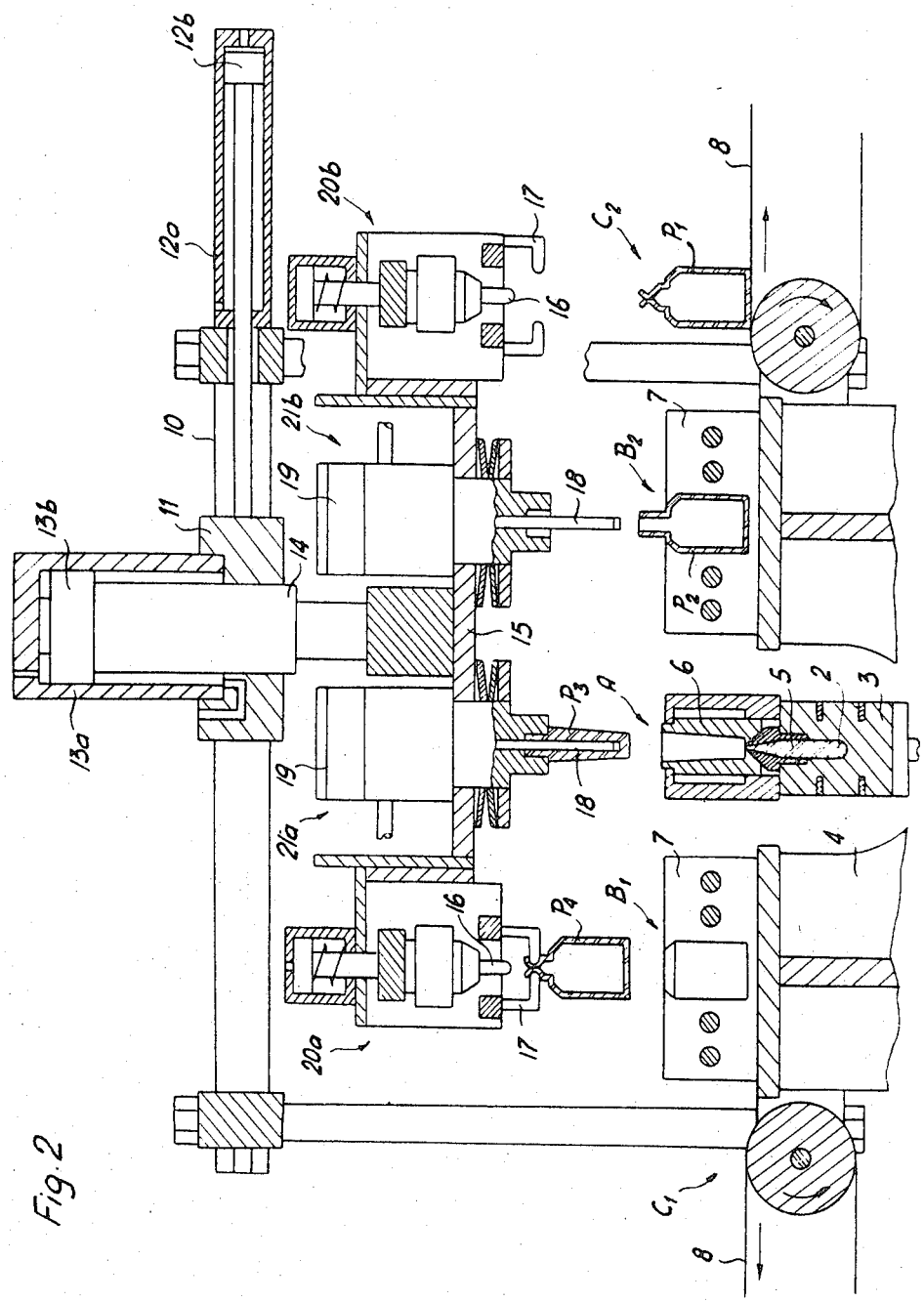

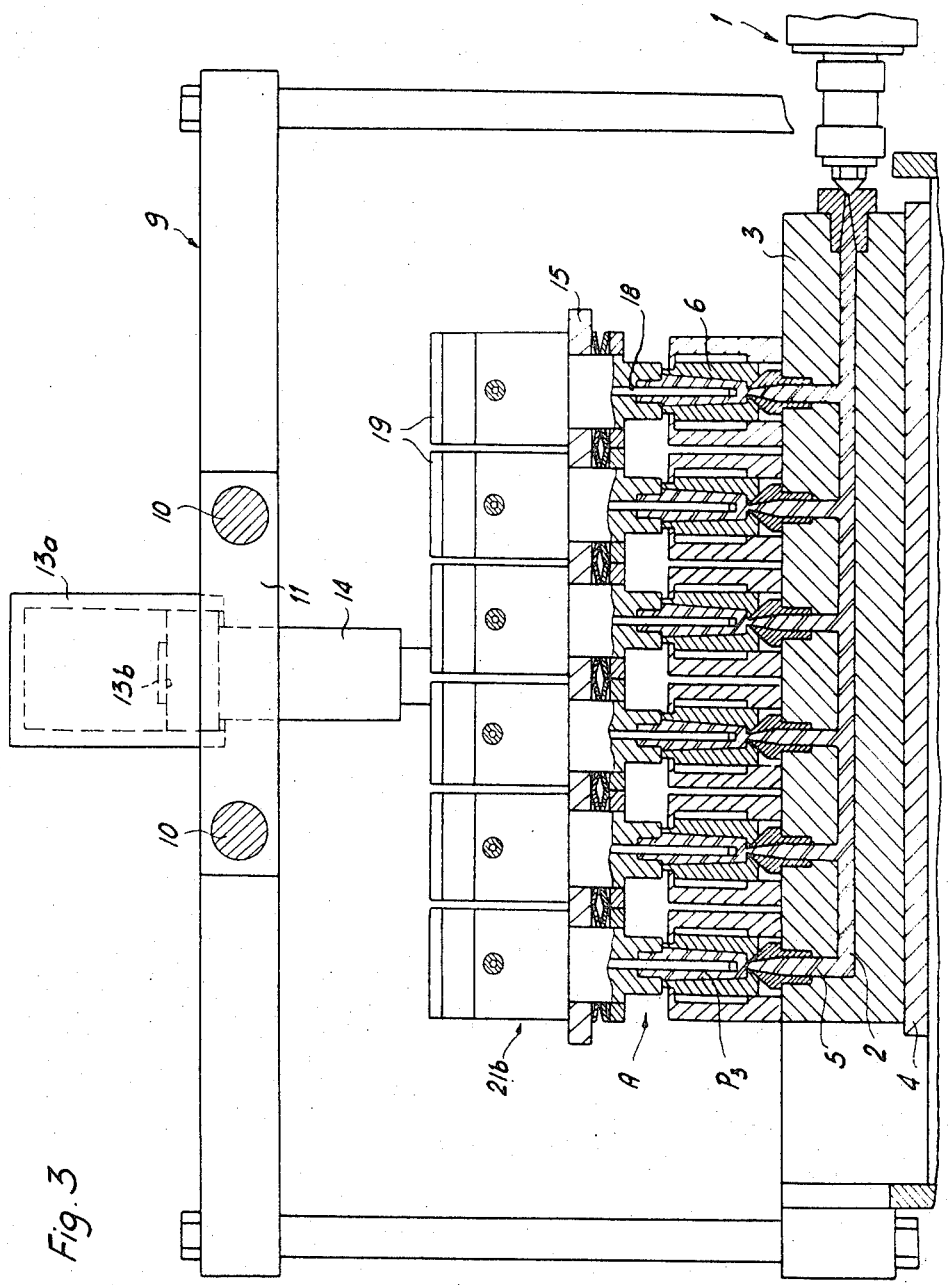

DEVICE FOR THE PRODUCTION OF FILLED AND CLOSED PLASTIC CONTAINERS

FIELD OF THE INVENTION

This invention relates to the production, filling, and closing of plastic containers and, more particularly, to a novel and improved method of and apparatus for producing a container preform, blowing up the preform and filling the container, closing the filled container and removing the filled container.

BACKGROUND OF THE PRIOR ART

The known methods for producing, filling and closing plastic containers, a preform, which is a so-called "parison," is produced in individual successive steps by means of a hollow injection mold and a core. The preform is then blown up by means of air or a filling material, in a blow mold, to form a container and it is then filled. The filled container is closed and is subsequently removed.

In order to make the capacity of a plant for performing this method as large as possible, the prior art procedure has been to arrange the necessary tools and working stations side-by-side in several rows, and the same steps are always carried out simultaneously in each row of stations. However, the cost of constructing such plants is relatively high, and the ejection period, that is, the period from the first step, which is molding of the preform, to the end of the last step, which is the removal of the filled and closed container, is still very long and independent of the number of concurrently working rows of stations.

SUMMARY OF THE INVENTION

The objective of the present invention is, on the one hand, to reduce substantially the ejection period as compared to known methods and, on the other hand, to reduce substantially the construction and operating costs of a device for carrying out the method, as compared to known devices.

To this end, the method in accordance with the invention is characterized in that the operations necessary for the production of a preform, for blowing up the preform and filling the resultant container, for closing a filled container and for removing the closed container, are carried out at different points but simultaneously, so that several containers are simultaneously in different processing phases. This method can be performed on the same device with several concurrently working rows of stations. A number of filled and closed containers is ejected and corresponding to the number of available concurrently working rows of stations, but not at the end of a cycle involving all necessary operations but after each step of the cycle. The ejection period correspondingly is short, and the entire production method has a more continuous, that is a less intermittent course.

The device or apparatus for performing the method comprises at least five stations arranged at equal distances from each other. The first and fifth stations are removal stations, the second and fourth stations are blow-up, filling and closing stations, and the third or central station is an injection molding station. A runner is reciprocated longitudinally of the row through a stroke corresponding to the distance between two adjacent stations, and is arranged above the lower stationary tools or the like provided in the five stations. This runner carries four upper tools on a vertically reciprocable support moving in and out of operating position at intervals corresponding to the station intervals. The entire arrangement is devised in such a way that the four upper tools can be made, in each end position of the runner, to cooperate with the end station of the row and the three stations immediately succeeding the end stations, by lowering the support or bridge.

As a result of this design of the apparatus, the invention method can be carried out particularly expediently, thus the moving tools have only to cover relatively short distances, which, in turn, results in a compact device requiring relatively little space.

An object of the invention is to provide an improved method of producing, filling and closing plastic containers.

Another object of the invention is to provide an improved apparatus for producing, filling, and closing plastic containers.

A further object of the invention is to provide such a method and apparatus in which the production of filled, and removal of filled, containers is expedited and the construction and operating costs of the apparatus are very substantially reduced, as compared to prior methods and devices.

For an understanding of the principles of the invention reference is made, to the following description of a typical embodiment thereof as illustrated in the accompanying drawing.

BRIEF DESCRIPTION OF THE DRAWING

In the Drawing:

FIG. 1 is a front elevation view, partly in section, of a multi-row device embodying the invention, showing the upper tools in one operating position;

FIG. 2 is a view similar to FIG. 1 but showing the upper tools just before they are lowered into the other operating position; and FIG. 3 is a transverse vertical sectional view taken along the line III—III of FIG. 1.

DESCRIPTION OF THE PREFERRED EMBODIMENT

The embodiment of the invention illustrated in the drawings has six rows each including five stations, by means of which six hollow plastic bodies can be produced, filled, closed and removed simultaneously. The apparatus is associated with an injection molding machine whose injection unit is indicated at 1 in FIG. 3. The injection nozzle of unit 1 is connected to a horizontal distributing channel 2 which extends, in alignment with injection unit 1 and its nozzle, transversely of the six rows through a distributing block 3 supported on the frame 4. Branch channels 5 extend upwardly from distributing channel 2 and terminate in the bottom ends of respective injection molds 6 which form the lower, stationary tools of the respective injection stations of the six rows of stations. Since all rows of stations are completely identical, only one row of stations will be described.

The injection station A, illustrated in section in FIG. 3, represents the third or central of the five stations of a row. Viewed from the left to the right in FIGS. 1 and 2, the first and fifth stations, $C_1$ and $C_2$, respectively, are removal stations, and the second and fourth stations $B_1$ and $B_2$, respectively, are blowing up, filling and closing stations. The intervals or spacings $a$ (FIG. 1) between the respective stations of a row are identical. Also, the blow molds 7 of the stations $B_1$ and $B_2$, forming the lower tools of these two stations, as well as the lower tools of the removal stations $C_1$ and $C_2$, formed by endless oppositely driven conveyor belts 8, are designed identically.

A bridge 9 is mounted on frame 4, and supports yoke bars 10 extending parallel to the several rows of stations. Yoke bars 10 support and guide a runner 11 which can be reciprocated horizontally by a hydraulic actuator 12a, 12b, from the end position shown in FIG. 1, through a stroke equal to the station spacing $a$ and to the other end position shown in FIG. 2. A hydraulic cylinder 13a is mounted on runner 11, and piston 13b is connected to a downwardly extending piston rod 14. A supporting plate 15 is secured on the lower end of piston rod 14, and carries the upper tools 20a, 21a, 21b, and 20b, described below, which are associated with the respective stations of the rows. Four upper tools 20a, 21a, 21b, and 20b, arranged at the spacings $a$, as indicated in FIG. 1, are provided for each row of stations. The first and fourth upper tools 20a, 20b, viewing the drawing from left to right, are closing and holding tools, and each of these tools comprises a heated mandrel 16 and a pair of clamping jaws 17. The second and third upper tools 21a and 21b each include a filling core 18 connected to a filling tank 19 arranged thereabove.

In performing the method of the invention, the described device operates, starting with the position of the various elements as shown in FIG. 1, in a manner which will now be described. In station $C_1$, a filled and closed plastic container $p_1$, still held by a clamping jaw 17, is placed on the associated conveyor belt 8 and, after clamping jaws 17 have opened, belt 8 moves container $P_1$ out of the device. At the same time, a preform is blown up at station $B_1$, on core 18, to form a container $P_2$, the blowing up being effected by the filling material so that container $P_2$ is simultaneously filled. Also at the same time, a preform $P_3$ is produced in station A by injection molding around core 18. Simultaneously with these operations, a blown up and filled container $P_4$ is heated in station $B_2$ by means of a mandrel 16, and is closed by means of clamping jaws 17. It will thus be seen that all four operations, including injection molding of a container preform, blowing up of the preform and filling of the resultant container, closing of a filled container and removal of a filled and closed container, are carried out simultaneously, that is, during the same time interval, but at different stations.

After this time interval, whose length depends on the longest individual operation to be carried out during this interval, supporting plate 15 with the upper tools, is lifted by hydraulic actuator 13a, 13b. Of the upper tools, which are lifted, tools 20a, and 21a rise empty, while tool 21b takes along preform $P_3$ and tool 20b takes along the closed container $P_4$. The blown up and filled container $P_2$ remains in the blow mold 7 forming the lower tool of station $B_1$. Then runner 11, with the supporting plate 15 carrying the upper tools, is moved by hydraulic actuator 12a, 12b, through the distance $a$ to the right as viewed in the drawing, so that upper tools 21a, 21a, 21b, and 20b are now vertically aligned with a lower tool of stations $B_1$, A, $B_2$ and $C_2$.

Following this, supporting plate 15 is lowered again to the lower level by hydraulic actuator 13a, 13b, so that upper tool 20a closes the filled container $B_2$ in station $B_1$, in the following operation, a new preform is molded in station A, and the preform $P_3$, inserted into the blow mold 7 of station $B_2$ by upper tool 21b, is blown up to form a container and is filled. Simultaneously, the closed container $P_4$, carried by upper tool 20b, is placed on conveyor belt 8 of stations $C_2$ and released by clamping jaws 17. Thus, the individual operations taking place during this time interval, in the stations $B_1$, A, $B_2$ and $C_2$ correspond to the individual operations carried out in stations $B_2$, A, $B_1$ and $C_1$ described with reference to FIG. 1.

Following this, supporting plate 15, with the upper tools, is lifted again by hydraulic actuator 13a, 13b, as shown in FIG. 2. Upper tools 20b, and 21b rise empty, as the filled container $P_2$ remains in blow mold 7 in station $B_2$ while the closed container $P_1$, formerly in station $B_2$, is removed by conveyor belt 8 of station $C_2$. Tool 20a carries along the new preform $P_3$, and upper tool 20a carries along the previously closed container $P_4$. Supporting plate 15 is again displaced along yoke rods 10 through the distance $a$ to the left, as viewed in the drawing, with subsequent lowering of supporting plate 15 into the operating position of the upper tools as shown in FIG. 1, so that, in the following step, the individual operations, described with reference to FIG. 1, take place in the stations $C_1$, $B_1$, A and $B_2$.

Each step, comprising four individual operations taking place simultaneously, thus produces a finished, filled and closed container and, since the above described steps take place simultaneously in all six station rows of the illustrated embodiment, the apparatus produces six closed containers in each step. The device or apparatus is simple and compact in design. The distance through which the upper tools are lifted and lowered, and displaced from left to right and vice versa, is relatively small, so that the unproductive time intervals necessary for carrying out these movements are likewise relatively short.

While a specific embodiment of the invention has been shown and described in detail to illustrate the application of the principles of the invention, it will be understood that the invention may be embodied otherwise without departing from such principles.

What is claimed is:

1. In apparatus for producing, filling and closing plastic containers, the improvement comprising, in combination, at least one row of five stations spaced equal distances longitudinally from each other; each second, third and fourth station including a respective stationary lower tool; the first and fifth stations of each row constituting removal stations including means for removing filled and closed containers, the second and fourth station of each row constituting blowup, filling and closing stations, for blowing up of the preform and filling of the resultant container and for closing of the filled container, and the third station of each row comprising an injection molding station including means for injection molding a container preform; four upper tools cooperable with said stationary lower tools and arranged in a row at distances from each other equal to the distances separating said stations; the first and fourth upper tools including filled container closing and gripping means, and the second and third upper tools including container preform forming and container blow-up and filling core means; means mounting said upper tools for reciprocation as a group longitudinally of the row of stations through a distance equal to the distance separating said stations from each other; and means operable to displace said upper tools, as a group, downwardly into operative relation with four lower tools and upwardly into a retracted position.

2. In apparatus for producing, filling and closing plastic containers, the improvement comprising, in combination, at least one row of five stations spaced equal distances longitudinally from each other; each station including a respective stationary lower tool; the first and fifth stations of each row constituting removal stations for removing filled and closed containers, the second and fourth station of each row constituting blowup, filling and closing stations, for blowing up of the preform and filling of the resultant container and for closing of the filled container, and the third station of each row comprising an injection molding station for producing a container preform; four upper tools cooperable with said stationary lower tools and arranged in a row at distances from each other equal to the distances separating said stations; means mounting said upper tools for reciprocation as a group longitudinally of the row of stations through a distance equal to the distance separating said stations from each other; means operable to displace said upper tools, as a group, downwardly into operative relation with four lower tools and upwardly into a retracted position, said means supporting said upper tools comprising a horizontally reciprocable runner carrying a vertically displaceable support mounting said upper tools; first actuator means operable to displace said runner horizontally; and second actuator means operable to displace said support vertically; said support having two end positions spaced by the distance between adjacent stations and, in one end position, aligning said four upper tools above the first four tools starting from one end of said row of stations and, in the other end position, aligning said upper tools with the first four lower tools starting from the opposite end of said row.

3. In apparatus for producing, filling and closing plastic containers, the improvement claimed in claim 2, in which said injection molding station includes an injection mold having a bottom injection opening; the lower tool of each of said second and fourth station comprising a blow mold; the lower tool of each of said first and fifth stations comprising an endless conveyor belt, said endless conveyor belts being driven in respective opposite directions; each of the two intermediate upper tools comprising a container filling core connected to a respective filling tank arranged thereabove; each of the two outer upper tools comprising a heated mandrel and a pair of clamping jaws.

4. In apparatus for producing, filling and closing plastic containers, the improvement claimed in claim 2, in which said second actuator comprises a hydraulic actuator having a vertically oriented piston rod which extends downwardly; said support being connected to the lower end of said piston rod; the cylinder of said second actuator being mounted on said runner.

5. In apparatus for producing, filling and closing plastic containers, the improvement claimed in claim 4, including a bridge; horizontal yoke bars mounted on said bridge; said runner being slidably mounted on said horizontal yoke bars; said first actuator comprising a hydraulic actuator including a cylinder mounted on said bridge and a piston connected to said runner.

6. In apparatus for producing, filling and closing plastic containers, the improvement claimed in claim 5, including a plurality of said rows of stations arranged in parallel juxtaposed relation with the respective stations of each row being laterally adjacent the corresponding stations of the immediately adjacent rows; all of the upper tools being mounted on a common support; and a common channel communicating with the openings of all of said injection molds for feeding the injection molding material.

* * * * *